(12) United States Patent
Marom

(10) Patent No.: US 6,950,609 B2
(45) Date of Patent: Sep. 27, 2005

(54) TUNABLE, MULTI-PORT OPTICAL ADD-DROP MULTIPLEXER

(75) Inventor: Dan Mark Marom, Howell, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 628 days.

(21) Appl. No.: 09/944,802

(22) Filed: Aug. 31, 2001

(65) Prior Publication Data

US 2002/0196493 A1 Dec. 26, 2002

Related U.S. Application Data

(60) Provisional application No. 60/300,272, filed on Jun. 22, 2001.

(51) Int. Cl.[7] .............................................. H04J 14/02
(52) U.S. Cl. ......................... 398/83; 398/79; 398/82; 398/84; 398/45; 385/24; 385/37
(58) Field of Search ............................... 398/83, 84, 82, 398/79, 45, 87, 88; 385/24, 37, 18, 31, 16, 17, 15, 27

(56) References Cited

U.S. PATENT DOCUMENTS 5,960,133 A * 9/1999 Tomlinson .................. 385/18
6,243,179 B1 * 6/2001 Thompson et al. ............ 398/9
6,493,117 B1 * 12/2002 Milton et al. ................ 398/49
6,657,770 B2 * 12/2003 Marom et al. .............. 359/290

* cited by examiner

Primary Examiner—Hanh Phan
(74) Attorney, Agent, or Firm—B. H. Freedman; D. A. Sasso

(57) ABSTRACT

A tunable (reconfigurable) OADM provides multiple drop ports and multiple add ports by which desired channels can be removed from, or added to, a composite optical signal. In one embodiment, a programmable demultiplexer is arranged to receive an input signal containing components at x different wavelengths from an optical input port, and distribute the input signal components among K output ports. K−1 of the output ports are the "drop" ports of the OADM, and cumulatively contain w different wavelengths. The remaining port, which is the "through port" that carries the z wavelengths not dropped from the original input signal, is connected to the first port of an M port programmable multiplexer having M−1 other input ports. The remaining M−1 ports are the "add" ports of the OADM, which cumulatively receive v different wavelengths to be added by the OADM.

9 Claims, 4 Drawing Sheets

TUNABLE, MULTI-PORT OPTICAL ADD-DROP MULTIPLEXER

CROSS-REFERENCE TO RELATED APPLICATION

This application claims priority of Provisional Application Ser. No. 60/300,272 which was filed on Jun. 22, 2001.

TECHNICAL FIELD

The present invention relates to optical communications, and more particularly to an arrangement for a tunable, multi-port optical add-drop multiplexer (OADM) that can add optical channels to, and extract optical channels from, an optical signal in a wavelength division multiplexing (WDM) system.

BACKGROUND OF THE INVENTION

The transmission capacity of fiber-optic communication systems has increased significantly by use of the wavelength division multiplexing (WDM) technique. In a WDM system, multiple channels, where each channel is differentiated by using a different wavelength of light, each carry modulated optical signals in a single optical fiber between transmitter and receiver nodes. In a typical optical communication system, it is desirable to have a few access nodes along the fiber path between the transmitter and receiver end terminals that have the ability to add and/or drop one or more optical channels. A node having this capability is often referred to as an optical add/drop multiplexer (OADM).

FIG. 1 illustrates a conventional OADM 110 arranged to drop and add only a single optical channel. OADM 110 has two input ports 120 and 130, and two output ports 140 and 150. Input port 120 carries multiplexed optical channels $\lambda_1$ through $\lambda_N$ from the communication line and input port 130 carries a local optical channel $\lambda_{i\text{-}add}$ that is to be added to the fiber link. Output port 140 contains all the optical channels $\lambda_1$ through $\lambda_N$ from the input port 120, except the optical channel $\lambda_{i\text{-}drop}$ that has been extracted and essentially replaced by $\lambda_{i\text{-}add}$. The dropped optical channel $\lambda_{i\text{-}drop}$ emerges from output port 150.

Some simple OADM's of the type shown in FIG. 1 are fixed, in that only a preassigned optical channel can be added/dropped; in more sophisticated arrangements, a reconfigurable system architecture may be used to implement a tunable optical channel OADM that is able to change the wavelength that is added and/or dropped.

A different architecture is conventionally required when an access node in an optical communication system has to add/drop more than one channel. FIG. 2 illustrates a solution based on a cascade of single channel OADMs at the access node. The multiplexed optical channels are introduced at input port 220 of a first OADM 210-1. The output port 240 of OADM 210-1 is connected to the input port of a second OADM 210-2. The output port 260 of OADM 210-2 carries all the multiplexed optical channels to be transmitted on the communication channel. OADMs 210-1 and 210-2 have channel add ports 230-1 and 230-2 and channel drop ports 250-1 and 250-2, respectively. Each OADM may be of the fixed channel type or tunable channel type.

While FIG. 2 shows, for illustrative purposes, a solution with two OADMs that can add/drop one channel each, for a total of two channels, more than two OADMs can be inserted at the access node using the serial cascade approach. The cascading solution, however, suffers from a high through loss for the channels that have to pass all the OADMs in the cascade from the communication system input 220 to the output 260.

FIG. 3 illustrates another conventional solution based on an OADM 310 that can add and drop multiple channels within a single device. An input port 320 carries the multiplexed optical channels from the communication line while input port 330 carries the multiplexed local optical channels that are to be added to the fiber link. The local channels to be added, which are available from transmitters 380-1 through 380-N, are combined in a multiplexer 360 and applied to input 330. Output port 340 carries multiplexed optical channels consisting of all the added optical channels from input port 330 and the through channels from the system input port 320. The dropped optical channels emerge from output port 350 as a group of channels, and must be separated in a demultiplexer 370 before being available to receivers 390-1 through 390-N.

The multiple channel OADM of FIG. 3 eliminates the high through loss associated with the cascading solution of FIG. 2; however, it requires additional hardware for multiplexing (with multiplexer 360) and demultiplexing (with demultiplexer 370) the added and dropped channels. If the added and dropped channels are a fixed subset, then only the required subset of optical channel transmitters in transmitters 380-1 through 380-N and subset of optical receivers in receivers 390 through 390-N are populated. This is an efficient solution. However, in a dynamic optical communication system, the added and dropped channels can change over time, according to demand. Complete network flexibility necessitates full population of all the optical channel transmitters 380-1 through 380-N and receivers 390-1 through 390-N. This is a very expensive solution, as only a subset of channels will typically be used at any given time, while the others remain idle. Tunable transmitters and receivers cannot be used with the multiplexers and demultiplexers, due to the fixed channel assignment between the input and output ports of such devices. Passive combining and splitting can be used, but the power budget for that solution is impracticable.

SUMMARY OF THE INVENTION

In accordance with the present invention, architectures for implementing an OADM are based upon and use the programmable optical multiplexer/demultiplexer as described in co-pending application Ser. No. 09/944,800 filed concurrently herewith and assigned to the same assignee as the present application. As described in the aforementioned co-pending application, a programmable optical demultiplexer is arranged to receive a multiplexed optical signal containing a plurality of separate channels, each with an associated wavelength, and independently assign each input optical channel to a desired output port. Likewise, a programmable optical multiplexer is arranged to receive a plurality of separate optical channels, each with an associated wavelength, and combine the different wavelengths into a single multiplexed optical signal that is made available at the multiplexer output port.

The present invention realizes a tunable (reconfigurable) OADM that provides multiple drop ports and multiple add ports by which desired channels can be removed from, or added to, a composite optical signal. The channels added to and dropped from the optical signal can be individual channels (with a single wavelength per channel) and therefore enabled for direct connection to fixed (or tunable) optical transmitters and optical receivers, respectively. Alternatively, the channels added to and dropped from the optical signal can themselves be multiplexed, enabling more advanced features. The OADM of the present invention provides a low loss architecture for all the optical signals that traverse through the device, as required for transparent optical networks.

In one embodiment of the present invention, a programmable demultiplexer is arranged to receive an input signal containing components at x different wavelengths from an optical input port, and distribute the input signal components among K output ports. K−1 of the output ports are the "drop" ports of the OADM, and cumulatively contain w different wavelengths. The remaining port, which is the "through port" that carries the z wavelengths not dropped from the original input signal, is connected to the first port of an M port programmable multiplexer having M−1 other input ports. The remaining M−1 ports are the "add" ports of the OADM, which cumulatively receive v different wavelengths to be added by the OADM. By appropriately controlling the demultiplexer and multiplexer, the OADM can independently both drop and add channels to the optical signal, resulting in an output signal containing y wavelengths. In the foregoing description, v, w, x, y and z are integers, where x+v−w=y and z=x−w=y−v.

In another embodiment of the present invention, the OADM includes additional multiplexers and/or demultiplexers, so that (a) the channels to be added are first themselves multiplexed before being added to the optical signal at the OADM, or (b) the channels to be dropped are initially grouped so that multiple channels are dropped at once, and the group of dropped channels is then demultiplexed to recover individual dropped channels.

BRIEF DESCRIPTION OF THE DRAWINGS

The present invention will be more fully appreciated by consideration of the following detailed description, which should be read in light of the drawing in which.

DETAILED DESCRIPTION

Figure 1:
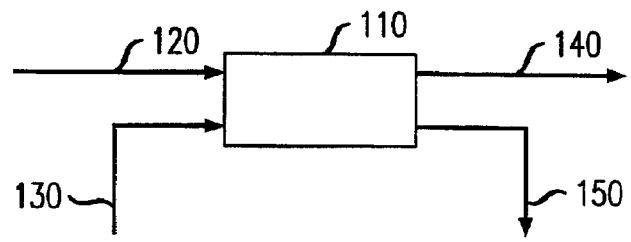
FIG. 1 is an illustration of a single channel OADM.
Figure 2:
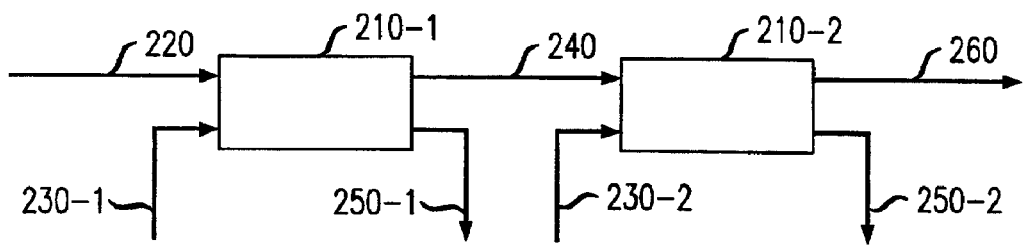
FIG. 2 is an illustration of a cascade of single channel OADMs for accessing multiple channels.
Figure 3:
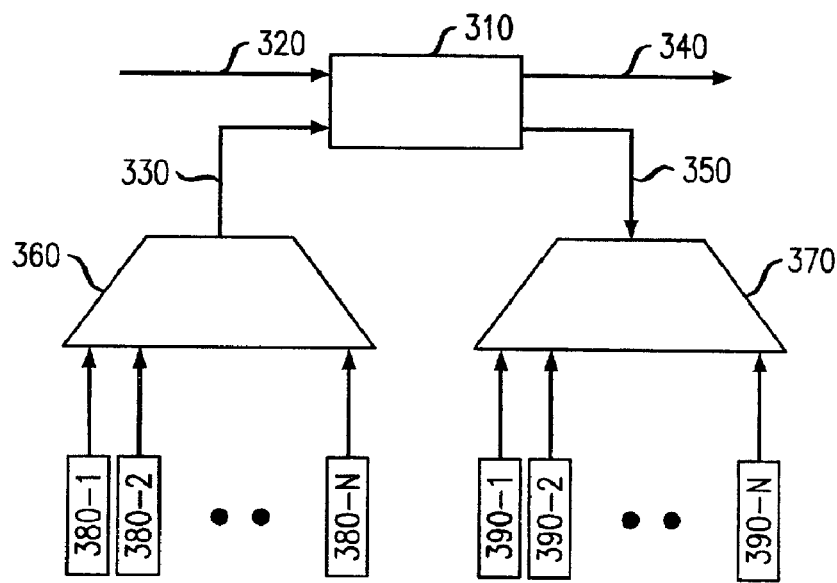
FIG. 3 is an illustration of a multiple channel OADM.
Figure 4A:
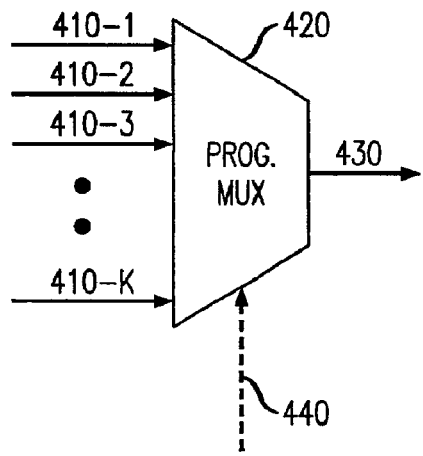
FIGS. 4(a) and (b) are illustrations of a programmable multiplexer and demultiplexer (respectively) that are the building blocks of the present invention.

The present invention describes new architectures for implementing an OADM that advantageously makes use of the programmable optical multiplexer/demultiplexer described in applicant's co-pending application identified above. For the purposes of completeness, the functionality of that element is described in connection with FIGS. 4(a) and 4(b) herein. As illustrated in FIG. 4(a), a programmable optical multiplexer 420 has K input ports 410-1 through 410-K and a single output port 430. Each of the input ports can receive an optical signal containing one or more optical channels from the set of λ-1 through λ-N, provided the channels of each input port are different. The optical signals are combined in the multiplexer, and emerge as a composite signal at output port 430 containing all the optical channels λ-1 through λ-N. Operationally, multiplexer 420 establishes a unique pathway for each optical channel between any one of the input ports 410-1 through 410-K and the output port 430, as prescribed by a control signal 440, physically preventing the detrimental possibility of combining two optical channels operating on the same wavelength from two different input ports.

Figure 4B:
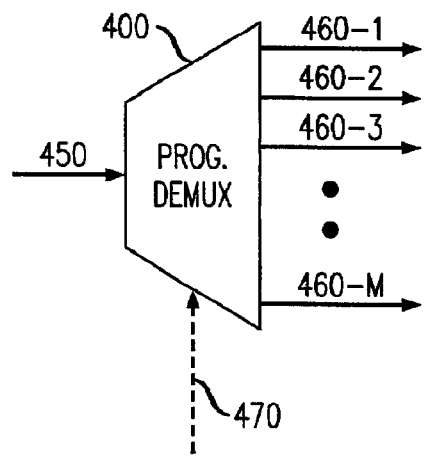

The programmable multiplexer of FIG. 4(a) can also be operated in the reverse direction and function as a programmable demultiplexer 400, as shown in FIG. 4(b). A single input port 450 receives a multiplexed optical signal containing a plurality of wavelengths or channels, and separates the signal so that one or more of the channels appears at each of the output ports 460-1 through 460-M. The assignment of specific channels to output ports is independent, and is determined by a control signal on input 470. In this demultiplexer, note that, if desired, one or more wavelengths applied at input port 450 can be output from that same port, instead of being output from one of the other output ports 460-1 through 460-M. This capability will be useful in connection with the OADM arrangement illustrated in FIG. 7 and described more fully below.

From the foregoing description, it is seen that the programmable multiplexer 420 of FIG. 4(a) and the programmable demultiplexer 400 of FIG. 4(b) can each be implemented in the same hardware device (assuming that K=M). It is to be noted that the device can be operated so that it concurrently acts as a multiplexer and as a demultiplexer. Using the demultiplexer of FIG. 4(b) as an example, in addition to the processing of wavelengths as described previously, wavelengths can be introduced into the device through ports 460-1 through 460-M at the same time that wavelengths are being output from those ports. However, each wavelength being processed in the device must have a unique path between an input port and an output port, which path may be traversed bi-directionally.

Figure 5:
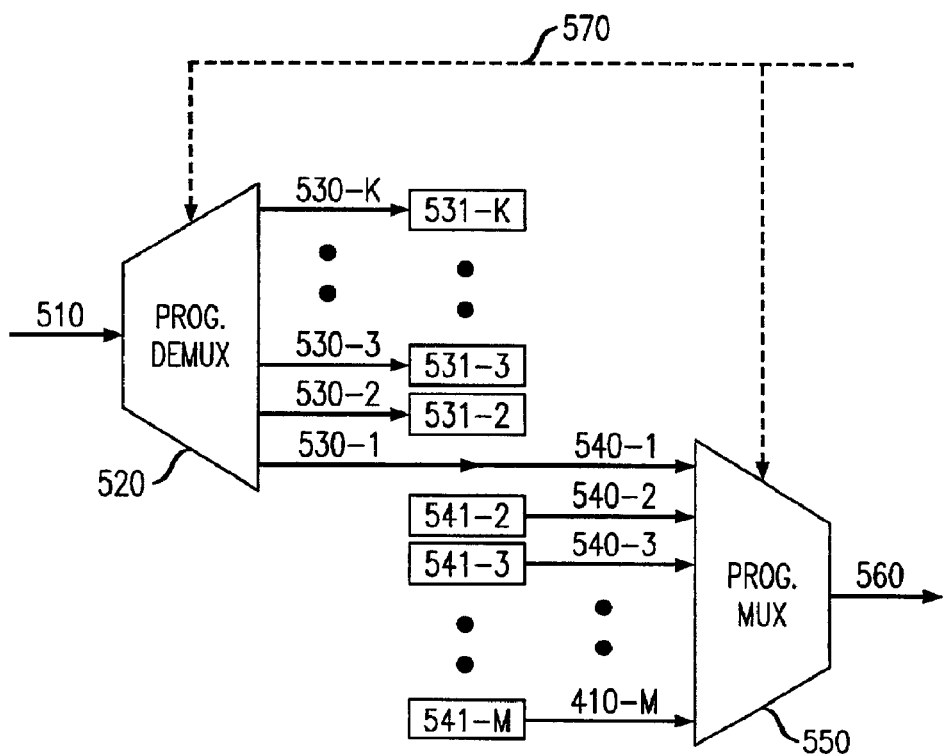
FIG. 5 is an illustration of an embodiment of an OADM arranged in accordance with the principles of the present invention and that includes a programmable demultiplexer followed by a programmable multiplexer.

FIG. 5 illustrates an embodiment of an OADM arranged in accordance with the present invention, using a programmable multiplexer and demultiplexer of FIGS. 4(a) and 4(b). An input port 510 carries the multiplexed optical channels λ-1 through λ-N of the communication system. A programmable demultiplexer 520 assigns the optical channels to the various output ports 530-1 through 530-K. The optical channels that are transmitted through the OADM (i.e., not dropped) are assigned to a first one of the output ports, namely output port 530-1. The dropped channels are assigned to the remaining ports, namely ports 530-2 through 530-K. Typically, the dropped channels are detected at the drop site, and therefore each drop port 530-2 through 530-K is usually terminated by an optical receiver 531-2 through 531-K. In this operation mode, a single dropped channel is assigned to an available drop port, so that up to K−1 channels can be dropped. (Note that multiple channels can be assigned to a drop port, as described more fully below.) Also note that optical detection may, instead of being performed directly at the drop port, be performed at a remote location, such as at a customer's premises. In that case, several dropped channels can be assigned to the drop port that leads to the customer for demultiplexing and detection of the multiple optical channels.

Still referring to FIG. 5, output 530-1 is called a "through route", and contains one or more of the optical channels that were present in the input signal on line 510, but of course does not include the channels that were dropped. The through route on output 530-1 is connected to the input port 540-1 of a programmable multiplexer 550, that has an additional M−1 input ports 540-2 through 540-M to which the "add channels" are introduced. Typically, a tunable optical channel transmitter 541-2 through 541-M is connected to each add input port and arranged to provide a signal containing a single optical wavelength. However, it is possible to add several multiplexed optical channels at each port 540-2 through 540-M, which may, for example, originate from a remote site, such as a customer's premise. Output port 560 carries the multiplexed optical channels, comprised of the through channels and the added channels. A control signal 570 directs the programmable demultiplexer 520 and multiplexer 550 to carry out the wavelength add and drop to and from the proper ports. In this embodiment, the add and drop channels are processed by two different devices, namely programmable demultiplexer 520 and programmable multiplexer 550, enabling the add channel wavelengths to either be different from the drop channels wavelengths or alternatively, have some drop channel wavelengths in common with the add channel wavelengths.

Figure 6:
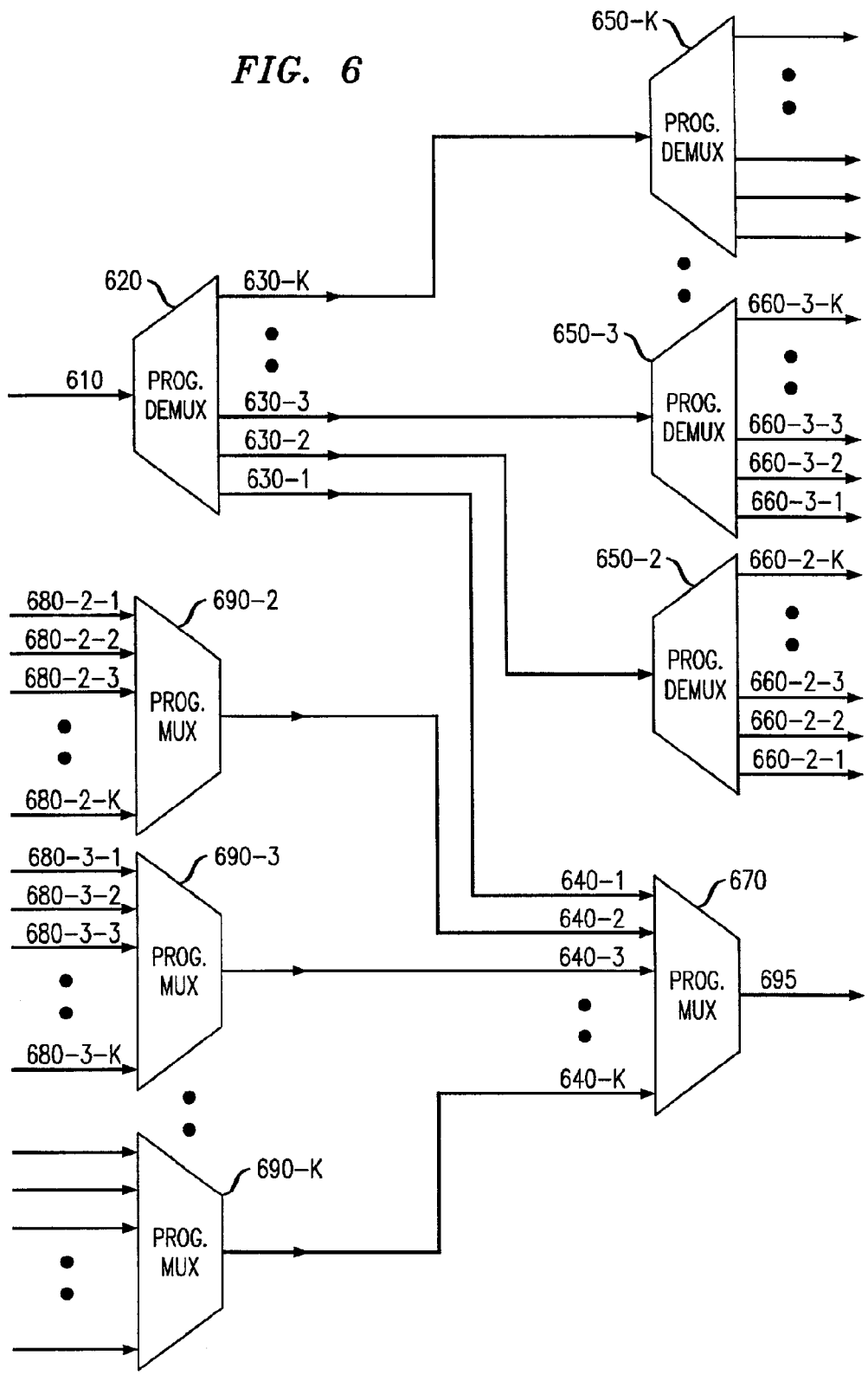
FIG. 6 is an illustration of an alternative embodiment of the OADM using a cascade of programmable multiplexers and demultiplexers for greater channel count.

If the number of added and dropped channels exceeds the number of available add ports M−1 and drop ports K−1 of the embodiment of FIG. 5, it is possible to cascade the programmable multiplexers and demultiplexers, as shown in FIG. 6. The input optical channels at the OADM are introduced at port 610, and enter the first programmable demultiplexer 620. The through channels exit at port 630-1, which is connected to input port 640-1 of programmable multiplexer 670, and emerge at the output port 695. The signal path of the through channels is identical to the signal path of the through channels in the embodiment of FIG. 5.

Drop channels exit programmable demultiplexer 620 at one of the other ports 630-2 through 630-K, and one or more of the outputs can contain multiple channels. For example, as shown in FIG. 6, outputs 630-3 and 630-2 each contain multiple channels, and are accordingly each connected to a second programmable demultiplexer 650-3 and 650-2, respectively. The second programmable demultiplexer increases the number of available drop ports. Such an arrangement is possible due to the ability of the programmable demultiplexer 620 to direct more than one channel to one or more of the output ports 630. In this embodiment, it is assumed that the second programmable demultiplexers 650-3 and 650-2 each direct a single the channel to a distinct output port for detection. However, it is possible to again iterate (i.e., nest) the process, if yet additional ports are needed.

Still referring to FIG. 6, an example of the path taken by a dropped channel is as follows: first, the channel exits programmable demultiplexer 620 from port 630-3, as part of a group of dropped channels. Port 630-3 is connected to second programmable demultiplexer 650-3, where the group of dropped channels is then demultiplexed, so that the dropped channel may illustratively exit from port 660-3-1. By connecting each of K−1 ports 630-2 through 630-K to a second programmable demultiplexer (650-2 through 650-K) that has K output ports, the total number of available drop ports can therefore increase up to K(K−1). Note however, that the OADM of FIG. 6 may also be implemented such that programmable demultiplexers 650-2 through 650-K having different characteristics than the first programmable demultiplexer 620, e.g., a greater or lesser number of ports.

In the arrangement of FIG. 6, the same cascading solution is implemented for the add channels as for the drop channels, just described. In particular, a series of multiplexers 690-2 through 690-M are each arranged to receive a plurality of add channels. For example, multiplexer 690-2 receives add channels 690-2-1 through 690-2-M, multiplexer 690-3 receives add channels 690-3-1 through 690-3-M, and so on. An example of the path of an added channel is as follows: the added channel is introduced at port 680-2-1, which is connected to programmable multiplexer 690-2, which is subsequently connected to input port 640-2 of programmable multiplexer 670, which leads to the output port 695. By virtue of the arrangement of FIG. 6, the number of available add ports can therefore increase up to M(M−1). As with the embodiment of FIG. 5, the OADM of FIG. 6 may drop and add different channels. Note that while programmable multiplexers 690-2 through 690-M can be the same as programmable multiplexer 670, they do not have to be. For example, if desired, some or all of the multiplexers 690-2 through 690-M can be fixed rather than programmable, in order to reduce cost. Likewise, programmable demultiplexers 650-2 through 650-K are not required to be the same as programmable demultiplexer 620. In FIG. 6, individual control signals to the programmable demultiplexers and programmable multiplexers are not explicitly shown, in order to reduce complexity of the drawing.

Figure 7:
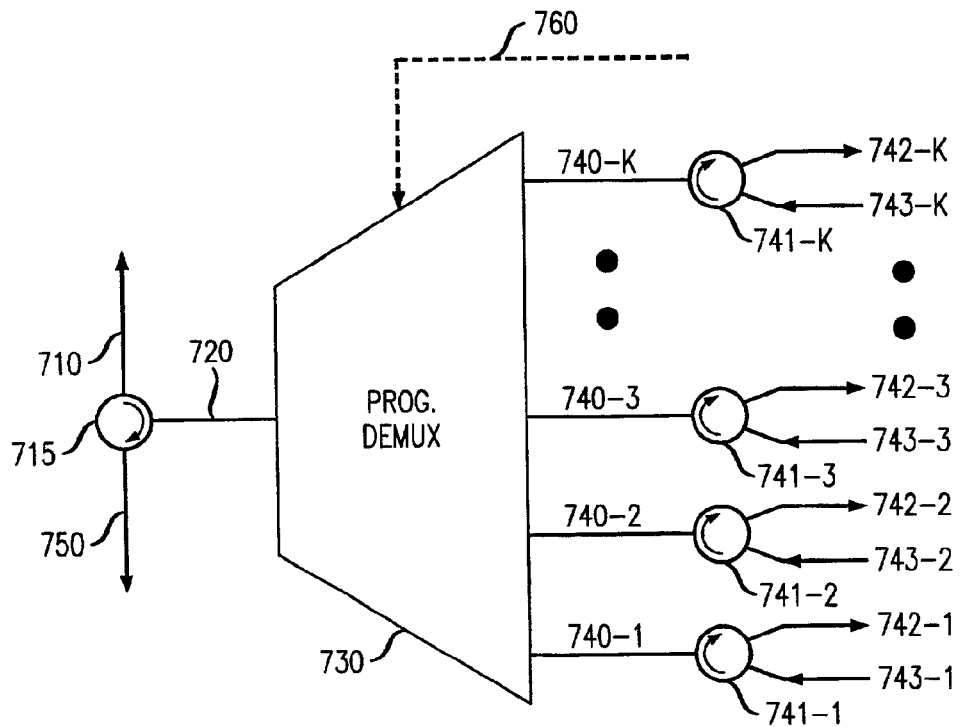
FIG. 7 is an illustration of another embodiment of the OADM using a single programmable demultiplexer with optical circulators.

FIG. 7 illustrates another embodiment of an OADM in accordance with the present invention, this embodiment utilizing a single programmable multiplexer/demultiplexer 730 operating in a bi-directional mode, as described previously, and a plurality of circulators for separating the add and drop channels. An input port 710 carrying the input multiplexed WDM channels is connected to a first optical circulator 715, which directs the input channels to input port 720 of the programmable demultiplexer 730. The control signal 760 applied to programmable demultiplexer 730 is arranged so that each channel to be dropped is directed to any available one of the output ports 740-1 through 740-K of demultiplexer 730. Each output port 740-1 through 740-K is attached to a corresponding optical circulator 741-1 through 741-K that directs the dropped channel to the corresponding drop port 742-1 through 742-K. An example of a drop path is from the input 710, via circulator 715 to input port 720 of programmable demultiplexer 730, to a demultiplexed output port 740-2 and via optical circulator 741-2 to drop port 743-2.

In the arrangement of FIG. 7, added channels are introduced from add ports 743-1 through 743-K, and are connected to respective ports 740-1 through 740-K of programmable multiplexer 730 via the corresponding optical circulators 741-1 through 741-K. The added channels emerge from port 720 where they are directed to output multiplexed port 750 via optical circulator 715.

Through channels enter programmable demultiplexer 730 via port 720 and are routed in programmable demultiplexer to emerge back on the input port 720. Optical circulator 715 directs the through channel traffic returning from the programmable demultiplexer 730 to the output multiplexed port 750.

As previously described, programmable demultiplexer 730, when operating in a bi-directional mode, must be arranged such that each wavelength being processed in the device has a unique path between an input port and an output port. Thus, the embodiment of FIG. 7 requires that each added wavelength be introduced at the same port at which the same wavelength is dropped.

Figure 8:
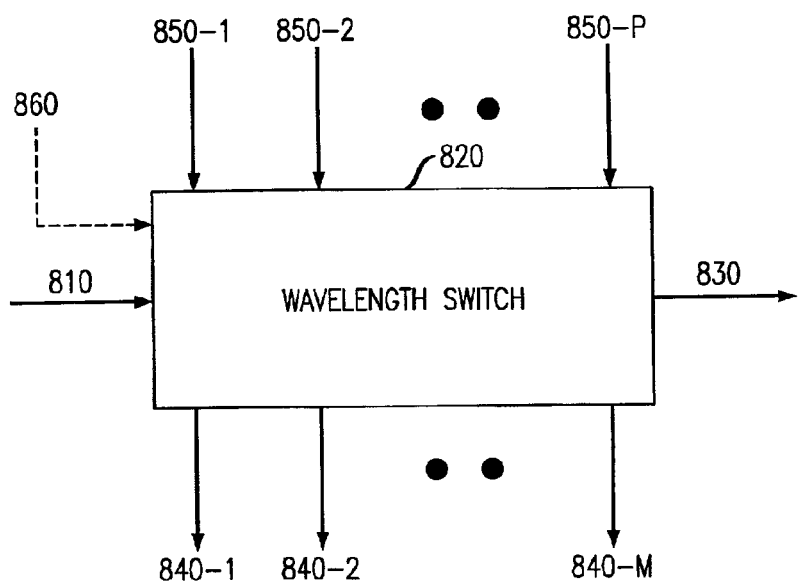
FIG. 8 is an illustration of an alternative embodiment of an OADM that uses a wavelength distribution switch with several input ports and several output ports, where optical channels do not occur on more than one input port.

FIG. 8 illustrates another OADM embodiment operated without wavelength contention, utilizing the wavelength switch shown in FIG. 4 of the above-mentioned co-pending application. The wavelength switch shown in the co-pending application has r input ports and s output ports, and is arranged so that any particular wavelength can enter the switch at one of the input ports and emerge from any one of the output ports. In FIG. 8, OADM 820 configures the wavelength switch to have a plurality of input ports 810 and 850-1 through 850-P (so that P+1=r), and a plurality of output ports 830 and 840-1 through 840-M (so that M+1=s). Input port 810 carries the WDM input from a communication system, and input ports 850-1 through 850-P are the add ports. Output port 830 carries the WDM output to the communication system and the remaining output ports 840-1 through 840-M are the drop ports. Control signal 860 determines the pathway taken within OADM 820 for each wavelength, between an input port and an output port. In this embodiment, any single input optical wavelength channel may appear at only one input port, preventing a particular optical channel from being both dropped and added concurrently by the OADM. This is because any wavelength to be dropped must inherently have been introduced into the OADM via input port 810, and that same wavelength cannot also be concurrently introduced at one of the add ports 850-1 through 850-P.

The path of a dropped channel is from the input port 810 through the programmable demultiplexer 820, to an available drop port of 840-1 through 840-M. The path of the through channels is from input port 810 through programmable demultiplexer 820 to output port 830. The path of the added channels is from an available input port 850-1 through 850-P through programmable demultiplexer 820 to output port 830.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. An optical add/drop multiplexer (OADM) arranged to add v optical channels to, and remove w optical channels from, an input wavelength division multiplexed optical communication signal containing x optical channels, in order to generate an output wavelength division multiplexed optical communication signal containing y optical channels, said OADM comprising a programmable demultiplexer having an input port and K output ports, said programmable demultiplexer arranged to receive said input signal containing said x optical channels on said input port and distribute one or more of said channels to each of said K output ports, wherein one of said K output ports is a through port containing z optical channels and wherein the remaining K−1 of said output ports are the drop ports of said OADM, and wherein said K−1 output ports cumulatively contain said w optical channels, a programmable multiplexer having M input ports and a single output port, said programmable multiplexer arranged to receive said z optical channels on one of said input ports and said v optical channels on the remaining M−1 of said input ports, and combine all of said channels on said M input ports onto said output port, to generate said output wavelength division multiplexed optical communication signal containing said y optical channels, and means for controlling (a) said demultiplexer to route desired drop and through channels from said input port of said OADM to said K output ports and (b) said multiplexer to route desired add and through channels from said M input ports to said output port of said OADM, wherein M and K are integers equal to or greater than 2 and wherein v, w, x, y and z are integers.

2. The invention defined in claim 1 wherein each channel from said w optical channels are distributed to a unique one of said K−1 output ports of said programmable demultiplexer.

3. The invention defined in claim 1 wherein each channel from said v optical channels is received by a unique one of said M−1 input ports of said programmable multiplexer.

4. The invention defined in claim 1 wherein more than one channel from said w optical channels is distributed to at least one of said K−1 output ports of said programmable demultiplexer.

5. The invention defined in claim 1 wherein more than one channel from said v optical channels is received by at least one of said M−1 input ports of said programmable multiplexer.

6. The invention defined in claim 4 wherein one or more of said K−1 output ports that contains more than one channel are each applied to a respective additional demultiplexer.

7. The invention defined in claim 5 wherein one or more of said M−1 input ports that contains more than one channel are each received from a respective additional multiplexer.

8. An optical add/drop multiplexer (OADM) arranged to add a first group of one or more optical channels to, and remove a second group of one or more optical channels from, an input wavelength division multiplexed optical communication signal containing a third group of one or more optical channels, in order to generate an output wavelength division multiplexed optical communication signal containing a fourth group of one or more optical channels, said OADM comprising a programmable wavelength switch having (a) a primary input port, (b) M−1 additional input ports constituting the add ports of said OADM, (c) a primary output port, and (d) K−1 additional output ports constituting the drop ports of said OADM, said programmable switch arranged to (i) receive said input signal containing said third group of optical channels on said primary input port and distribute one or more of said channels to each of said K−1 additional output ports, wherein said K−1 output ports cumulatively contain said second group of optical channels, and (ii) combine all of said channels on said M−1 additional input ports onto said primary output port, to generate said output wavelength division multiplexed optical communication signal containing said fourth group of optical channels, and means for controlling (a) a demultiplexer to route desired drop and through channels from said input port of said OADM to said K output ports and (b) a multiplexer to route desired add and through channels from said M input ports to said output port of said OADM, wherein M and K are integers equal to or greater than 2.

9. An optical add/drop multiplexer (OADM) arranged to add a first plurality of optical channels to, and remove a second plurality of optical channels from, an input wavelength division multiplexed optical communication signal in order to generate an output wavelength division multiplexed optical communication signal, said OADM comprising a programmable demultiplexer having an input port and K output ports, said programmable demultiplexer arranged to receive said input signal on said input port and distribute one or more of said channels to each of said K output ports, wherein one of said K output ports is a through port containing a plurality of optical channels and wherein the remaining K−1 of said output ports are the drop ports of said OADM, and wherein said K−1 output ports cumulatively contain said second plurality of optical channels, an M port programmable multiplexer having M input ports and a single output port, said programmable multiplexer arranged to (i) receive (a) on one of said input ports, said plurality of optical channels output on said one of said K output ports of said programmable demultiplexer and (b) said first plurality of optical channels on the remaining M−1 of said input ports, and (ii) combine all of said channels on said M input ports onto said output port, to generate said output wavelength division multiplexed optical communication signal, and means for controlling (a) said demultiplexer to route desired drop and through channels from said input port of said OADM to said K output ports and (b) said multiplexer to route desired add and through channels from said M input ports to said output port of said OADM, wherein M and K are integers equal to or greater than 2.

* * * * *